United States Patent [19]
Juzukonis et al.

[11] Patent Number: 6,090,905
[45] Date of Patent: Jul. 18, 2000

[54] COMPOSITIONS AND METHODS FOR CONTROLLING STICKIES

[75] Inventors: Walter A. Juzukonis; Shih-Ruey T. Chen, both of Pittsburgh, Pa.

[73] Assignee: Calgon Corporation, Pittsburgh, Pa.

[21] Appl. No.: 09/249,005

[22] Filed: Feb. 12, 1999

[51] Int. Cl.[7] .................................................. C08G 59/42
[52] U.S. Cl. ............................. 528/114; 528/86; 528/87; 528/99; 528/100; 528/101; 528/206; 162/157.1; 162/157.2
[58] Field of Search ................................ 528/114, 86, 87, 528/99, 100, 101, 206; 162/157.1, 157.2

[56] References Cited

U.S. PATENT DOCUMENTS

| | | |
|---|---|---|
| 3,494,889 | 2/1970 | Hairston et al. . |
| 4,792,355 | 12/1988 | Siegl et al. . |
| 4,795,505 | 1/1989 | Siegl et al. . |
| 4,883,826 | 11/1989 | Marugg et al. . |
| 4,917,729 | 4/1990 | Siegl et al. . |
| 4,952,732 | 8/1990 | Speranza et al. . |
| 5,223,097 | 6/1993 | Hassler . |

FOREIGN PATENT DOCUMENTS

WO 95/28449  10/1995  WIPO .

OTHER PUBLICATIONS

Kumar et al., "Mannich reaction N–[2–Hydroxy–3 (or 5 or 6)–substituted] Benzyl Glycines", 83:10779, 1975.

*Primary Examiner*—Duc Truong
*Attorney, Agent, or Firm*—Diane R. Meyers; Eckert Seamans Cherin & Mellott, LLC

[57] ABSTRACT

Mannich-derivatized polyphenolic compositions prepared by the reaction of a phenolic compound having at least two phenol rings with an aldehyde and an amphoteric compound having both a basic moiety and an acidic moiety are disclosed. Methods for utilizing such compositions in the control of stickie formation in papermaking are also disclosed.

22 Claims, 4 Drawing Sheets

COMPOSITIONS AND METHODS FOR CONTROLLING STICKIES

FIELD OF THE INVENTION

The present invention relates to compositions and methods for controlling stickies in fiber pulping and paper making processes. More particularly, the present invention relates to phenolic compositions that have been subjected to Mannich derivatization using an aldehyde and an amphoteric compound having both amine and acid moieties. The present invention also relates to methods for treatment of pulp and paper slurries to inhibit the formation and deposition of stickies and tackies and to remove stickies from machinery used in fiber pulping and papermaking processes using the compositions of the present invention.

BACKGROUND OF THE INVENTION

Stickies and tackies continue to be a problem in secondary fiber pulp and paper mills. It is believed that the problems caused by the build up of stickies and tackies on pulp and papermaking machinery and in the final paper cost the pulp and paper industry many millions of dollars per year in lost production. The terms "stickies" and "tackies", as used herein, are interchangeable terms that primarily include synthetic contraries found in secondary fiber. More particularly, stickies are defined as adherent deposits caused by organic materials used in paper and board coating and converting operations which are typically introduced into paper machine furnishes with recycled fibers. The word "stickies" is derived from the fact that the resultant deposits stick to wires, felts, and other parts of paper machines. Stickies also trap inorganic components found in papermaking furnishes. Stickies are a diverse mixture of synthetic materials ranging from hot-melt and pressure-sensitive adhesives to binders and coatings for inks or wet strength resins. ink residuals, tars and latexes. Polymeric examples include, for example, polyethylenes, polybutadiene-styrenes, polyvinylacetates and polyacrylates.

Stickies are found in secondary fiber and in systems where paper produced in a mill is used as broke. As such, stickies and tackies are distinct from pitch, which is defined as any resin-based deposit of widely varying constituency; pitch is material comprising naturally occurring resinous materials and gums liberated during the screening, heating and refining processes that occur during papermaking. Pitch originates in the extractive fraction of wood. The extractive fraction of wood is a complex mixture of substances which are soluble in water, alcohol, benzene, ether, and/or acetone. The extractive fraction, which generally makes up from about 3% to 10% of the weight of wood, contains such components as low molecular weight carbohydrates, terpenes, aromatic and aliphatic acids, alcohols, tannins, color substances, proteins, lignins, and alkaloids. The constituents of pitch are naturally occurring, as opposed to the synthetic compounds that comprise stickies. While pitch and stickies cause similar problems in papermaking operations, they are distinct both in terms of their origin and their composition. While the present invention is generally directed to stickies control, it will be understood that any pitch present in the paper stream being treated may also be controlled according to the present invention.

Stickies and tackies are a major problem in secondary fiber pulp and papermaking operations because they (1) agglomerate and also occlude other matter to form visible "dirt" in the final paper, (2) plate out and collect on machinery used in pulping and papermaking process such as screens, filters, refining equipment, pulp washers, and paper machines, and (3) reduce pulp brightness and brightness stability. The composition and amount of stickies deposited on pulping and papermaking machinery and in the final paper varies with the type of secondary fiber used in the pulping operation. As used herein, the term "secondary fiber" includes any paper fiber used for a second time in the production of a paper end-product.

Sources of secondary fiber include, but are not limited to, tissue, fine paper, boxboard, linerboard, foodboard and newsprint. Each of these sources generally contains unique impurities, such as inks, colors, fillers, strength resins and/or coatings, which means that the stickies composition and concentration can vary widely from one secondary fiber to another.

The presence of calcium carbonate in the pulping process generally exacerbates the problem of stickies deposition on pulp and papermaking machinery. Crystallized calcium carbonate can provide nucleation sites for precipitated metal soaps thereby producing hydrophobic particles which coalesce with other particles to form a stickies deposit.

There have been many attempts over the years to eliminate stickies problems by adding control agents to secondary fiber pulping and/or papermaking processes. While more thorough deinking and pulp washing operations may help to reduce stickies problems, the most common methods of treatment involve the addition of dispersants or adsorbent fillers to the furnish. For example, treatments may involve the use of zirconium compounds, alum, talc, anionic stickies-control agents such as polynaphthalene sulfonates or modified lignosulfonates, cationic control agents such as polyquaternary ammonium polymers, methylcellulose derivatives and nonionic surfactants. None of these treatments are believed to be particularly effective for stickies control.

U.S. Pat. No. 5,223,097 reports a method for controlling pitch in an aqueous papermaking system by adding to the system a polymer derived from epichlorohydrin, diepoxide, or precursors thereof, and alkyl amine and an amine. Mannich-derivatized compounds do not appear to be disclosed.

Examples of attempts to control pitch with other types of compounds or processes are found in, for example, U.S. Pat. Nos. 3,583,461; 3,703,563; 3,812,055; 3,895,164; 3,896,046; 3,992,249; and 4,313,790.

Zirconium chemicals have also been used to control pitch and stickies. See, for example, U.S. Pat. No. 4,950,361.

The use of melamine formaldehyde-type polymers to control stickies deposition in papermaking is reported in U.S. Pat. No. 5,433,824, and the use of such compounds in the control of pitch deposition is reported in U.S. Pat. No. 5,286,347.

Methods for inhibiting sticky deposition are reported in U.S. Pat. No. 4,995,944, which uses a solution containing a cationic polymer containing a cationic surfactant.

Mannich derivatized phenolic and polyphenolic compounds are described in the art. None of the polyphenolic compounds have been prepared by reaction with an amino acid or other amphoteric compound such as those disclosed herein. For example, U.S. Pat. No. 3,494,889 discloses epichlorohydrin resins that have been cured with Mannich derivatized bisphenol products. The patent teaches a bisphenol product having four Mannich substitutions of the formula $CH_2NHR$, where R is hydrogen, methyl, ethyl, N-propyl, N-butyl, or alkenyl of three to four carbon atoms. U.S. Pat. No. 4,952,732 relates to Mannich condensates of a substituted phenol and alkylamine containing internal alkoxy groups. The invention is reported as relating to Mannich condensates prepared by reacting formaldehyde with phenol or a phenol substituted in the ortho or para position with a hydrocarbon group and also with an alkylamine, where the alkyl group is separated from the amine group by one or more propoxy groups or by a mixture of ethoxy groups and propoxy groups. WO95/28449 discloses a polymer that is a Mannich derivative of a novolac resin. U.S. Pat. No. 4,883,826 discloses a polyol prepared by alkoxylating a Mannich condensate of a phenolic compound, formaldehyde, and a mixture of diethanolamine and at least one other alkylamine. U.S. Pat. No. 4,917,729 discloses metal chelating compounds that are Mannich derivatized bisphenol compounds, having two Mannich groups, one attached to each ring of the bisphenol A. U.S. Pat. Nos. 4,795,505 and 4,792,355 relate to a similar compound having only a single phenol ring and a single Mannich substituent. There is no disclosure of the use of amino acids or other amphoteric compounds in the Mannich Reaction in any of these references. Nor is there any disclosure of use of a di- or polyphenolic Mannich derivative to reduce stickies in paper treatment.

Chem. Abstract 83:10779 reports a Mannich reaction of glycine and formaldehyde with substituted phenols. Only single aromatic ring phenols are reported and the abstract is silent as to the derivitization of polymers. Similarly, no use of the compounds is disclosed.

None of the above patents teach compositions that have at least two aromatic rings that have been Mannich-derivatized using an aldehyde and an amphoteric compound having both an amine and acidic moiety. Nor do any of the references teach the use of such compounds, or any related compounds in the reduction of stickie formation. There remains a very real and substantial need, therefore, for compounds useful in such applications.

SUMMARY OF THE INVENTION

The present invention has met the above-described needs by providing compositions and methods useful in the control of stickies and tackies during paper manufacture. As used herein, the term "control" of stickies and/or tackies encompasses both the inhibition of stickie formation and deposition, as well as the removal of stickies from aqueous systems and papermaking equipment. The compositions of the present invention are generally described as phenolic compounds having at least two phenol rings to which is attached at least one amphoteric substituent, that has both an amine and an acid moiety. Salts of such substituents are also within the scope of the present invention. The present compositions are the result of the Mannich derivatization of a phenolic compound using an aldehyde and a compound containing both an amino functionality and an acidic functionality. Preferred are amino acids and amino acid derivatives.

The present invention also provides methods for the control—that is, the inhibition of stickie deposits on, and the removal of stickie deposits from—pulping and/or papermaking machinery, particularly wet-end papermaking machinery. This method comprises adding to a stickies-containing pulp slurry or paper furnish in contact with the machinery an effective amount of a phenolic composition of the present invention. Improved end products resulting from the present method are also within the scope of the invention.

It is therefore an object of the invention to provide novel phenolic compounds having two or more phenol rings that have been Mannich derivatized using an aldehyde and an amphoteric compound.

It is another object of the invention to provide such compounds that are useful in the inhibition of stickies in papermaking processes.

Another object of the present invention is to provide a method for removal of stickies from pulp and papermaking machinery using the phenolic compositions of the present invention.

Another object of the invention is to provide improved paper products prepared according to the methods of the present invention.

These and other objects of the invention will be apparent to those skilled in the art based upon the attached detailed description and appended claims.

DETAILED DESCRIPTION OF THE INVENTION

Figure 1:
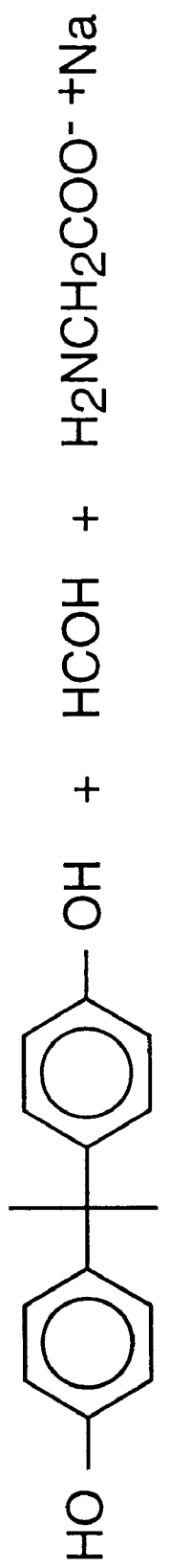
FIG. 1 shows a schematic diagram of a method for preparing a preferred compound of the present invention.
Figure 1:
Figure 1:
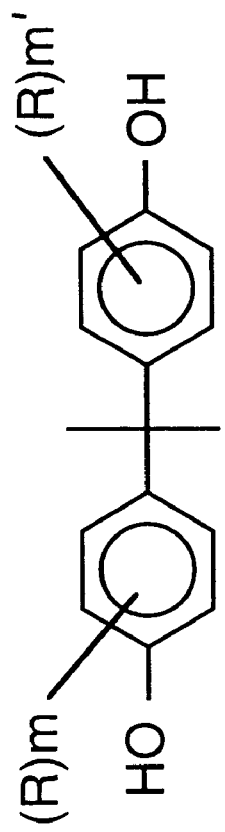
Figure 1:

The present invention is directed to a phenolic composition having at least two phenol rings, wherein at least one amphoteric substituent, or salt thereof, is attached to at least one of the phenol rings.

According to the present invention, the phenolic compounds have at least two aromatic rings and are generally referred to herein as "polyphenols" or "polyphenolic compounds". The two aromatic rings can be contained in one molecule, or can be part of a polymer or resin having numerous phenol rings. Examples, but not limitations, of suitable polyphenolic compounds according to the present invention include bisphenols, in which two phenol rings are present; novolacs, which are polymers comprised of numerous phenol rings; and polymers of bisphenol and other resins.

It will be appreciated, therefore, that the polyphenolic compounds of the present invention can be either a collection of single molecules or polymers made up of numerous repeat units. When a collection of single molecules, such as a bisphenol composition, is being referenced, at least one amphoteric substituent will be attached to one of the two phenol rings of at least one bisphenol molecule. It is within the scope of the invention for more than one amphoteric substituent to be attached to moire than one of the rings, as is discussed further below. Similarly, if the bisphenol is polymerized with a resin, there will be at least one amphoteric substituent on at least one of the two bisphenol rings on at least one repeat unit of the polymer. When the present polyphenol is a resin, such as a novolac polymer, at least one of the repeat units in the polymer will have an amphoteric substituent attached thereto.

"Amphoteric substituents" and "amphoteric compounds", as those terms are used herein, refer to substituents or compounds that have both a basic component and an acidic component; these components are found together on the same molecule. An example of a suitable basic component is an amine group and examples of suitable acidic components are carboxyl groups (COOH) and sulfonate groups ($SO_3$). Preferred amphoteric compounds are amino acids and amino acid derivatives; the amphoteric substituents which result or derive from these compounds are the preferred amphoteric substituents.

An amino acid is an organic acid containing both a basic amino group ($NH_2$) and an acidic carboxyl group (COOH); thus, amino acids are amphoteric. All but one of the amino acids (proline) have the general formula (1) depicted below:

(1)

where Q represents the side chain unique for each amino acid, as will be known to those skilled in the art. For example, Q=$CH_3$ in the case of alanine, H in the case of glycine, $CH_2SH$ in the case of cysteine, and the like.

Amino acid derivatives similarly contain at least one amine group and one carboxyl group, but have other variations from formula 1. For example, amino acid derivatives can have more than one amino group and/or more than one carboxyl group. There can also be numerous variations in the number of carbons between the amine and carboxyl groups; anywhere from 1 to 4, or even more, carbon atoms can be present. Examples include, but are not limited to, 4-aminobutyric acid, DL-3-aminobutyric acid, (S)-(+)-2-aminobutyric acid, 6-aminocaproic acid, DL-2-aminocaprylic acid, 8-aminocaprylic acid, 12-aminododecanoic acid, 2-aminoethyl hydrogen sulfate, (2-aminoethyl)trimethylammonium chloride hydrochloride, 2-aminoisobutyric acid, aminomethanesulfonic acid, and 3-amino-1-propanesulfonic acid. Preferred is 4-aminobutyric acid. The acidic portion of the amino acid and certain amino acid derivatives is generally represented as $CO_2^-$ or COOH, which is a carboxylic acid moiety. Compounds having other acidic moieties are also within the scope of the invention. For example, compounds having an $SO_3$ acidic group are within the invention. Examples include but are not limited to taurine.

The substituted polyphenolic compositions of the present invention can be generally described as Mannich derivatives of polyphenols. The terms "Mannich derivative" and "Mannich derivatized" refer to the product which results by reacting a phenolic composition with an aldehyde and an amine. Reactions between a phenol, aldehyde, and an amine are referred to generally as Mannich reactions, and the methods for performing such reactions are well known to those skilled in the art.

Formaldehyde is typically the preferred aldehyde for use in the Mannich reaction, although any suitable aldehyde can be used.

According to the present invention, the "amine" compound utilized in the Mannich reaction is represented, at least in part, by an amphoteric compound that has an amine moiety. Amphoteric substituents can be used alone as the amine in the Mannich reaction, or can be combined with one or more other amines. For example, an amphoteric substituent can be combined with a primary amine, secondary amine, alkanol amine, dialkanol amine, or mixtures thereof. An example of a suitable primary amine is ethanolamine. Suitable secondary alkyl amines which may be used are those of the general formula (2)

(2)

in which $R^1$ and $R^2$ are the same or different and are selected from the group consisting of H, $C_xH_{2x+1}$ and $C_xH_{2x}$—OH, where x is between about 1 and 18. Methylethanolamine (MEA) and diethanol amine (DEA) are preferred to be used in combination with amphoteric compounds according to the present invention, with DEA being most preferred.

When the amphoteric compounds are combined with other amines for use in the Mannich reaction, it is preferable that the amphoteric compounds are present in at least a 1:1 range with the other amines. Enough of the amphoteric compounds should be used in the Mannich reaction to ensure that at least one phenol ring will have an amphoteric substituent. Use of at least about 50% of an amphoteric compound as the amine in the Mannich reaction is typically sufficient to ensure this result.

Salts of the amphoteric compounds and their resulting amphoteric substituents are also within the scope of the present invention. Suitable salts can be compared, for example, by adding sodium hydroxide or another base to the reaction. Such bases assist in solubilization of the polyphenolic compounds.

The compositions of the present invention have the property of being soluble at high pH's. Thus, preparing, for example, sodium salts of the phenolic compositions improves the solubility of the compound in aqueous solutions. The ability to solubilize the compounds of the present invention by merely making a salt from the compound provides an advantage of the present compounds over Mannich derivatives prepared without an amino acid. Another means by which the present polyphenols can be solubilized is through the use of a surfactant. An effective amount of surfactant for solubilizing the polyphenol can be added to the polyphenolic composition. Any suitable surfactant can be used absent compatibility problems with the composition itself, or problems which might arise based on the end use of the polyphenol. Examples of suitable surfactants include the alcohol ethoxylates such as Tergitol®, which is commercially available from Union Carbide. Use of surfactant, rather than base, is often preferred as it moves the pH of the composition closer to neutral. This provides safety advantages in both transport and use of the compositions. Use of acid rather than base will also solubilize the polyphenols.

It will further be appreciated that the amphoteric substituent found on at least one phenol ring of the present polyphenols is unlike the cationic or nonionic substituents typically attached during Mannich reactions. For use in the methods of the present invention, it is believed that the amine group allows the amphoteric substituent to attach to the phenol ring, while the acidic portion of the substituent provides for the performance of the compositions in stickie control; the inventors do not wish to be bound by this mechanism, however.

A particularly preferred composition according to the present invention is that prepared using a bisphenol as the starting phenol. Appropriate bisphenols according to the present invention are generally represented by the formula (3)

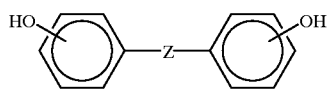

(3)

wherein Z is selected from a straight chain or branched chain aliphatic having 1 to 3 carbon atoms. The preferred bisphenol is bisphenol A (BPA) in which Z is 2,2-propylidene and the two OH groups are in the para position relative to the "Z". Other bisphenols which can be used include, but are not limited to, 4,4'-thiodiphenol and 4,4'-sulfonyl diphenol. Bisphenol resins are widely commercially available.

Mannich derivatization of a bisphenol results in a product generally represented by formula (4):

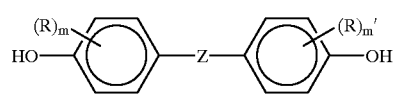

(4)

wherein R represents the amphoteric substituent and m+m' the number of amphoteric substituents on each bisphenol. The value of m+m' for at least one molecule in the polyphenol will be between 1.0 and 4.0. It will be understood that a plurality of bisphenol molecules will be present in the polyphenolic compositions, and the number of R groups on each molecule will vary. Typically, an average number of substituents between 1 and 4 yield suitable results, with 2 to 3 substituent groups working well.

It will be further understood that if using a mixture of amphoteric compound and amine in the Mannich Reaction, that some of the "R" groups will represent the Mannich derivative group which corresponds with the amine being used. For example, if DEA is used in conjunction with the amphoteric compound, some of the "R" groups in the polyphenol will be $C_2H_4OH$. According to the present invention at least one "R" on at least one phenol ring of at least one bisphenol molecule will represent an amphoteric substituent. If using a large percent of amino acids in the Mannich reaction, for commercial reasons it might be advisable to utilize the lowest number of amphoteric substituents possible while still obtaining the desired results since amino acids and their derivatives tend to be expensive. In this manner, the user can lower costs without sacrificing performance.

Mannich derivatization of other phenolic compounds, such as novolacs, are also within the scope of the compositions of the present invention. A "novolac" is a thermoplastic phenol-formaldehyde-type resin generally prepared with acid or neutral catalysts, and excess phenol. Novolac is generally represented by the following formula (5)

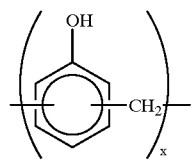

(5)

wherein "x" represents the number of repeat units in the polymer. It will be appreciated that formula 5 above and formula 6 below represent one repeat unit in the string of repeat units that comprise the phenol resin. Within the scope of the present invention at least one of these repeat units would have an amphoteric substituent attached thereto, which is represented in formula 6 by the "R".

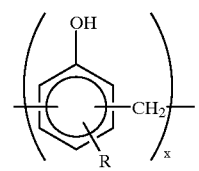

(6)

Again, such a compound would be prepared by performing a Mannich reaction between the novolac, an aldehyde, and an amphoteric compound, alone or in conjunction with one or more other amines. Thus, various repeat units in the polymer could also have attached thereto other "R" groups, such as $C_2H_4OH$ if DEA is used with the amphoteric compound. Typically, when running the Mannich reaction with novolac, there will be one "R" group attached to the phenol ring of each repeat unit. It will be understood that some repeat units can have no "R" groups, while others could have as many as three "R" groups. Within the scope of the present invention, at least one R group representing an amphoteric substituent is attached to at least one repeat unit of the novolac polymer.

The present invention also encompasses the Mannich derivatives of any other polyphenolic compounds, as that term is defined herein, comprising at least one amphoteric substituent on one phenol ring. The preparation of such a composition would also be by the Mannich reaction using an aldehyde and an amphoteric compound, or a mixture of an amphoteric compound in conjunction with one or more other amines.

The polyphenolic compositions of the present invention also include the compounds described above further polymerized with a second composition, such as an epoxide. For example, the Mannich reaction can be run on a bisphenol compound to yield the Mannich derivatized phenolic compounds having at least one amphoteric substituent. This composition can then be further polymerized with, for example, an epoxy resin having two epoxy groups (a difunctional epoxy can be used). A preferred epoxy is a diglycidyl capped prepolymer of bisphenol and epichlorohydrin. Such a polymer is illustrated in formula 7 below.

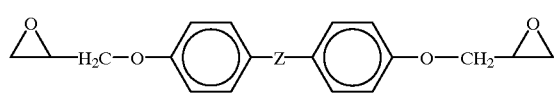

(7)

wherein Z is selected from a straight chain or branched chain aliphatic having between 1 and 3 carbon atoms. The most preferred of these resins is the difunctional bisphenol A-based epoxy resin, where Z is 2,2-propylidene. The preferred diepoxy resin, therefore, is diglycidyl ether of BPA (DGEBPA), which is commercially available from Shell Chemicals, Houston, Tex., in its EPON® line of liquid epoxy resins and resin blends. Particularly preferred is EPON® 828, having a molecular weight of between about 370 and 384. Other EPON® products having molecular weights ranging between 350 and 1450 can also be used. In addition, any other resin that forms a suitable condensation polymer with the Mannich-derivatized phenolic compounds of the present invention can be used.

The phenolic compositions of the present invention are preferably prepared in a suitable solvent. As used herein, the term "suitable solvent" refers to any organic or inorganic solvents, or mixtures thereof, which are capable of dissolving or solubilizing the polyphenolic composition. Examples include, but are not be limited to, alcohols, ketones, glycolether based solvents and mixtures of these solvents. Particularly preferred are ethanol, propylene glycol, N-propyl ether, and dipropylene glycol methyl ether.

The phenolic compositions of the present invention can further be methylated, protonated or quaternized by addition of the appropriate methylating, protonizing, or quaternizing agent, respectively. Use of such an agent would result in a permanent quaternary molecule that had more hydrophobic qualities than the untreated molecule. This results in preserving the amphoteric nature of the molecule over a wide range of pH values.

As discussed above and as it will be appreciated by those skilled in the art, the number of phenolic rings which will undergo derivatization in a composition or polymer during the Mannich reaction, expressed as the "degree of derivatization", can vary. That is, the number of amphoteric substituents attached to each phenol ring can vary from molecule to molecule or repeat unit to repeat unit. While at least one molecule or repeat unit has at least one amphoteric substituent, the polyphenolic compound will typically have a plurality of molecules or repeat units each of which has a different number of amphoteric substituents. In addition, if using an amine in conjunction with the amphoteric substituent, a portion of the substituents will be amphoteric and a portion will derive from the amine. Typically, the degree of derivatization of the entire polyphenolic compound, or the average number of substituents per molecule in a bisphenol composition, will be between about 0.5 to 4.0, with the range of 2.0 to 3.5 being preferred. This is true if the bisphenol compound is used alone, or is further polymerized with an epoxy or other resin. For the novolac compositions of the present invention there will typically be one substituent attached to each repeat unit, with a range of 0.5 to 3 substituents being typical for the overall polymer. Thus, some phenol rings in the present polyphenols may have no Mannich substituents, while others may have several.

The Mannich-derivatized polyphenolic compounds according to the present invention preferably have a molar ratio of polyphenol:aldehyde:amphoteric compound (and amine, if relevant) ranging between about 1:1:1 to 1:4:4. When the Mannich-derivatized polyphenolic compound is further polymerized with another resin, such as polymerization of a bisphenol with an epoxy, the ratio of polyphenol to resin will typically range between about 1:2 and 2:1, with a ratio of 1.5:1 being preferred.

Although the phenolic compounds of the present invention are soluble in organic solvents, and can be used when dissolved in an organic solvent, as a practical matter it will be desired to apply the treatment compound from water solution. Means for improving the water solubility of the polyphenols are discussed above.

A preferred embodiment of the present compounds used in the present methods is depicted in FIG. 1. There, bisphenol A (BPA) is reacted with formaldehyde and sodium glycinate (the sodium salt of glycine) to yield a Mannich derivatized bisphenol A (MBPA). Each MBPA molecule in the compound can have between 0 and 4 amphoteric substituents, which would be represented in FIG. 1 as m+m' equalling between 0 and 4, with at least one of the bisphenol molecules have m+m' equal to at least one.

Figure 2:
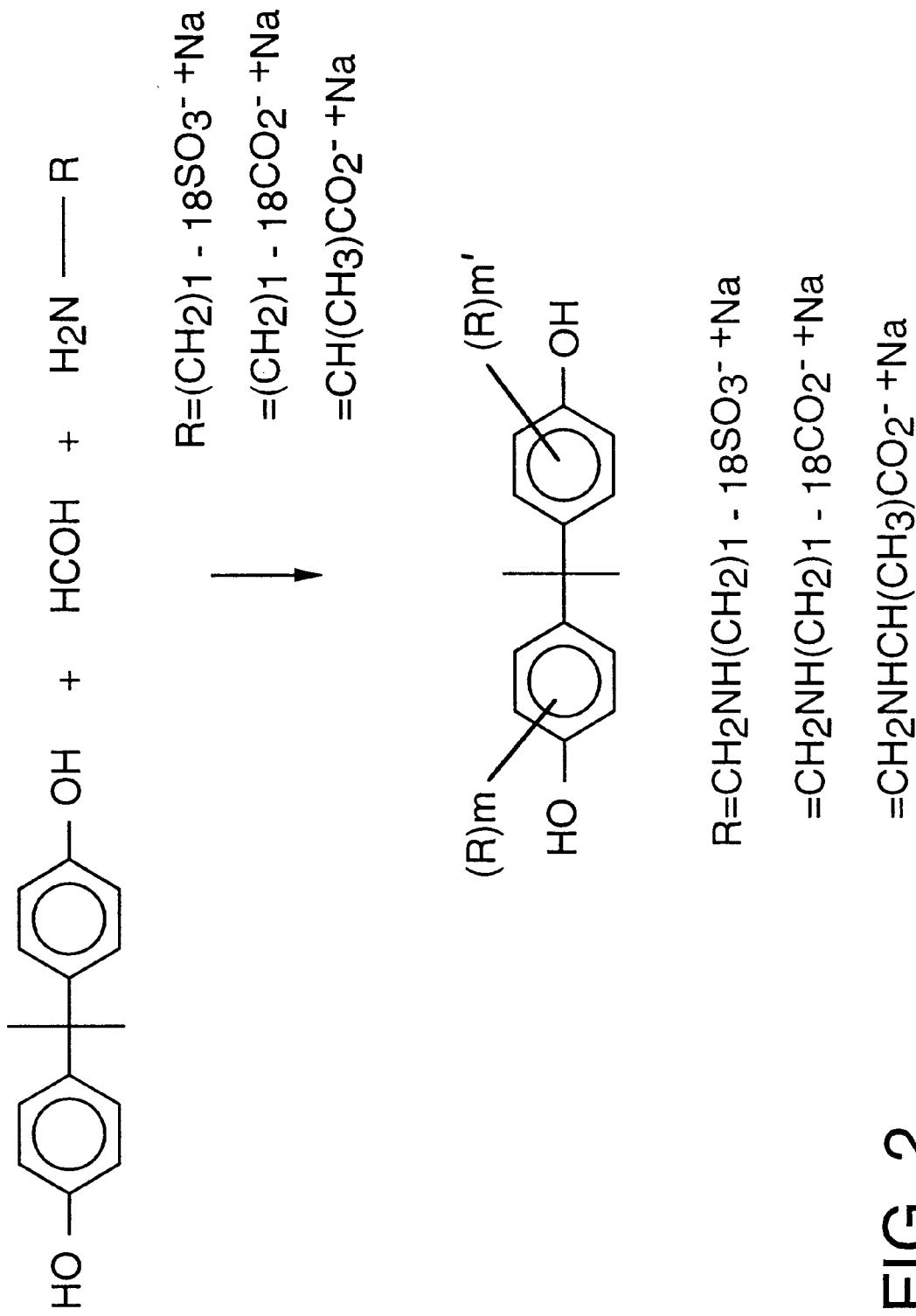
FIG. 2 shows a schematic diagram of methods for preparing compounds of the present invention with bisphenol.

FIG. 2 shows a reaction scheme similar to that of FIG. 1, wherein BPA is reacted with formaldehyde and an amphoteric compound, generally represented in FIG. 2 as "$H_2N$—R". As indicated in FIG. 2, R can be any one of a number of different compounds, such as those wherein the acidic component of the amphoteric substituent is $SO_3^-$ or $CO_2^-$; amino acid derivatives are also generally represented by the "R" in FIG. 2. While FIG. 2 depicts the R groups as being sodium salts of the amphoteric compound, such compounds in their non-salt form could also be used. The product of the reaction between the BPA, formaldehyde and the amphoteric substituent is shown in FIG. 2 with two "R" groups, one which is attached to each of the two phenol rings of the bisphenol molecule. Again, m+m' can be between 0 and 4 for each of the MBPA molecules in the composition, while at least one of the molecules has m+m' equal to at least one. The various "R" group substituents that can be attached to the Mannich derivative of BPA are shown below the molecule, and generally correspond with the R group used in the amphoteric compound.

Figure 3:
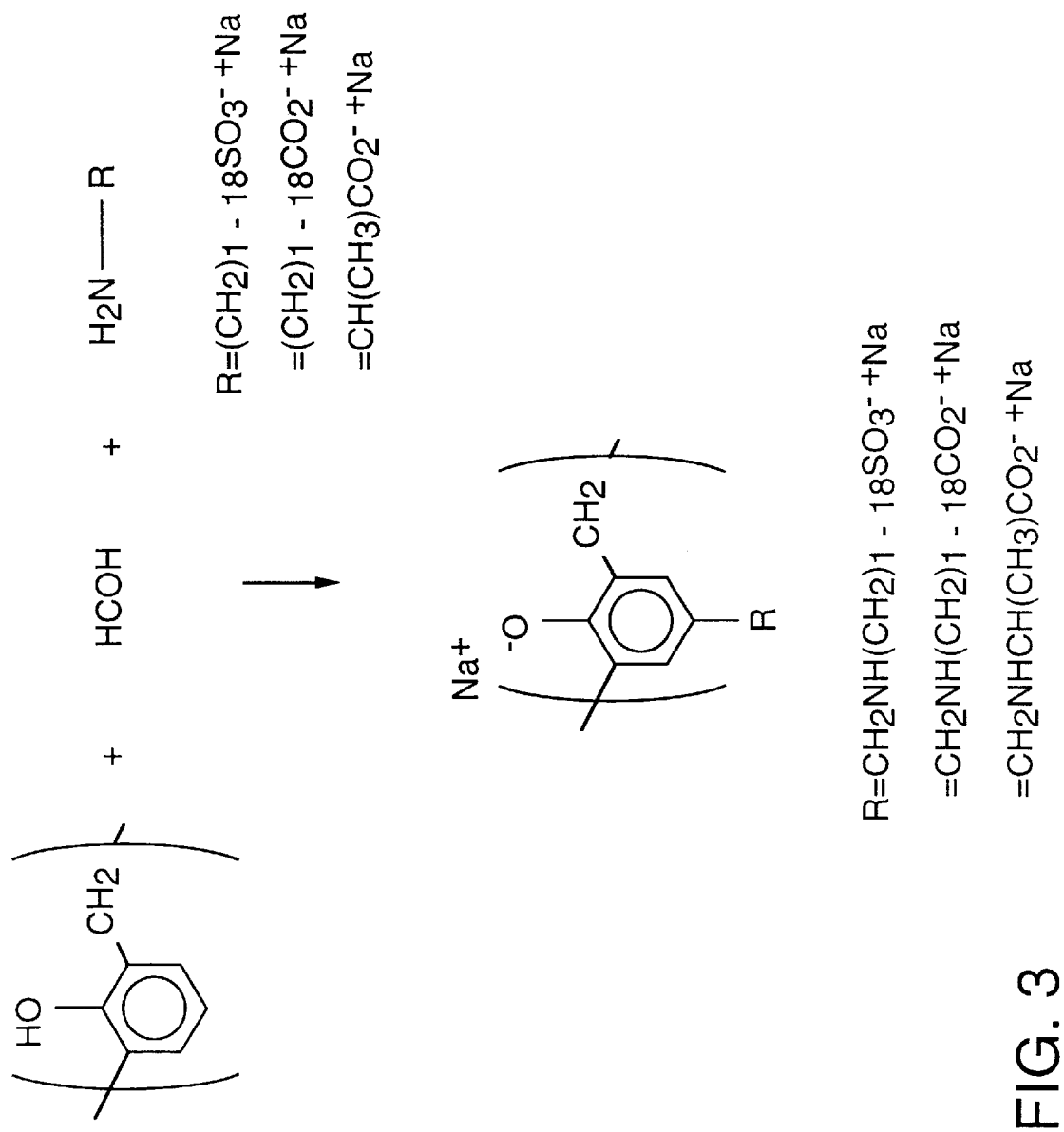
FIG. 3 shows a schematic diagram of methods for preparing compounds of the present invention with novolac.

FIG. 3 shows compounds of the present invention wherein a novolac resin is reacted with formaldehyde and an amphoteric compound to result in the polyphenols of the present invention having at least one amphoteric substituent attached to at least one repeat unit of the novolac. Again, representative R groups which can be used in the amphoteric compounds generally include amino acids, amino acid derivatives and compounds wherein the acidic component is $SO_3$. The corresponding "R" group attached to at least one repeat unit of the Mannich derivatized novolac polymer is also shown in the figure.

Figure 4:
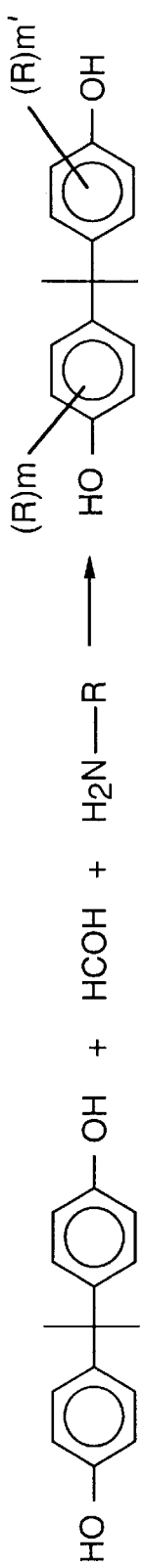
FIG. 4 shows a schematic diagram of the method for preparing a Mannich-derivatized bisphenol that is polymerized with an epoxy according to the present invention.
Figure 4:
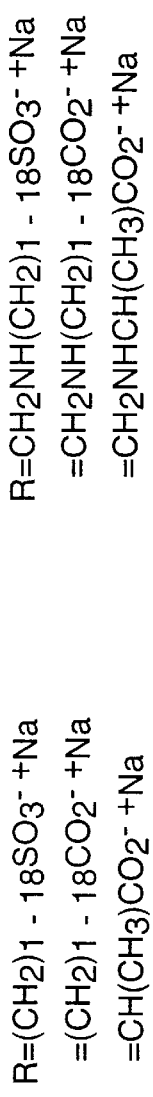
Figure 4:
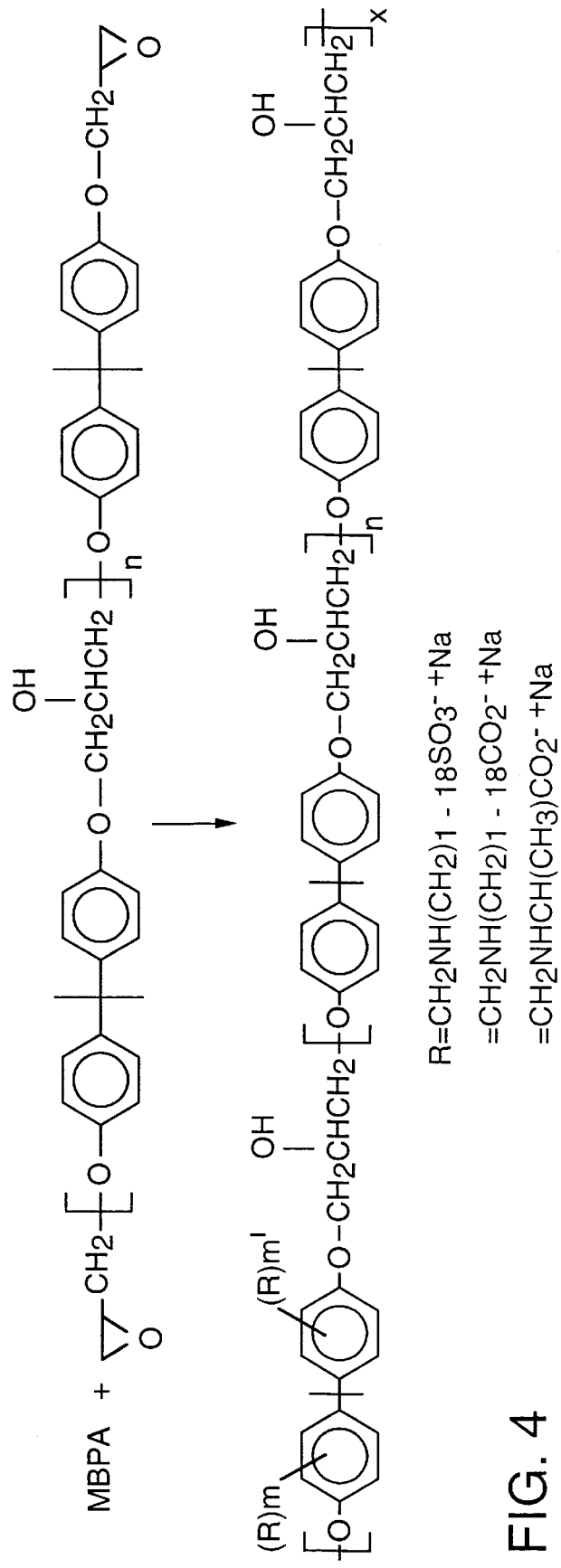
Figure 4:
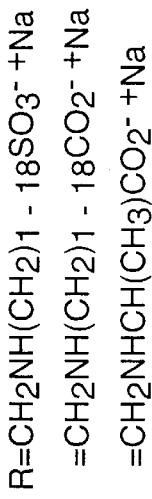

In another embodiment of the compounds of the present invention, shown in FIG. 4, the MBPA prepared according to reaction shown in FIG. 2 is further reacted with DGEBPA to form a polyether. Again, the different "R" groups attached to the bisphenol during the Mannich reaction, and ultimately the resulting polyether, will vary depending on the "R" group used in the amphoteric substituent.

The present invention is also directed to methods for inhibiting stickies deposition on pulping and/or papermaking equipment or machinery, such as that in contact with the furnish, stock or papermaking stream containing stickies. Similarly, another method according to the present invention is for removing existing stickies deposits from such equipment or machinery. Both methods, referred to collectively as "controlling" stickies, comprise adding to a solution containing stickies an effective amount of the phenolic compositions of the present invention. A "stickie-containing solution" refers generally to any type of solution, stream, and the like which contains stickies, including but not limited to furnish, stock, or papermaking streams, particularly a furnish, stock or papermaking stream containing secondary fiber. The methods can also be used to control stickies in systems where paper produced in the mill being treated is used as broke.

As used herein, the term "effective amount" refers to that amount of any of the polyphenolic compositions described above necessary to bring about the desired result. That is, the amount of polyphenolic composition needed to control stickies is added. The effective amount will typically depend on the volume of stickie-containing solution to which the polyphenolic composition is being added, but at least about 0.01 pound of polyphenolic composition, based on active polymer weight per ton of dry fiber in said stickie-containing solution, gives an improved result. The determination of the optimum amount of polyphenolic composition to be used depending on the result desired and the system being treated is within the determination of one skilled in the art. It is believed that the polyphenolic compositions interact with the stickie contaminants contained in such streams, thereby inhibiting stickie deposition, and/or removing existing stickie deposits from the surfaces of papermaking equipment, although the inventors do not wish to be bound by any particular mechanism.

The percent, by weight, of active polyphenolic composition in a stabilized suspension or solution for use in the present invention typically contains at least about 0.1 percent active ingredient. Any percent active can be present, for example, from 0.1% to 50%. A percent active of between about 5 and 15% will typically be a preferred range for use of the product, with between about 8 and 9% being more preferred. Cost and product stability considerations, as well as needs of the user, will play a role in determining the percent active in the end use composition.

The pH of the polyphenolic composition in solution should typically be high enough to keep the phenolic composition in solution, and preferably is between about 12 and 13, more preferably about 12.5. Use of a surfactant allows for solubilization of the product while bringing the pH value down into the neutral range. Use of acid rather than base will also solubilize the polyphenols.

The molecular weight of the phenolic composition for use according to the present invention should typically be fairly low. As used herein, the term "low molecular weight" refers to molecular weights of below about 20,000. Preferably, the molecular weights of the polyphenolic compositions used in the present methods will be below about 20,000, more preferably below about 10,000, more preferably below about 5,000.

The phenolic compositions can be applied intermittently or continuously to the papermaking stream being treated, at a preferred dosage of at least about 0.01 pound polymer per ton of dry fiber, on an active polymer basis. More preferably, the dosage should be maintained between about 1 pounds per ton to about 4 pounds per ton. A preferred active range is between about 1 and 10,000 ppm, more preferably 10 to 1,000 ppm and most preferably 10 to 100 ppm, active ingredient per ton of air dried fiber. Additions should be made continuously or intermittently as desired by the user to maintain levels of polyphenol at an effective amount. The phenolic composition can be added at any convenient location, but is preferably added so as to allow the maximum contact between the composition and the stickies. For example, the phenolic composition may be added to secondary fiber washers, deckers, high density chests or machine dilution chests. Addition at the points where fiber is being broken apart, such as the pulping stage, is preferred. Also, multiple points of addition may be used.

It is contemplated that the phenolic compositions of the present invention will be used in a working solution at a dilute concentration, as discussed above. Under some circumstances, however, for example, transporting or storing the solution, a concentrate of the solution may be preferred.

As an example of an embodiment representative of the best mode, a Mannich derivative is prepared via the Mannich reaction using BPA, formaldehyde and glycine. This composition is then added to the pulping stage at a concentration of about 50 ppm active ingredient per ton of dry fiber.

EXAMPLES

The following examples are intended to illustrate the invention and should not be construed as limiting the invention in any way. All of the amphoteric compounds used in the Examples were obtained from Aldrich or Fisher Scientific.

Example 1

Deionized $H_2O$ (75.0 g), DL-Alanine (99%, 1.1 mole) (100.0 g), and NaOH (50%) (88.9 g) were added to a 400 Ml beaker and stirred at ambient temperature until homogeneous. Bisphenol A (97%, 0.6 mole) (130.7 g) and Di(propylene glycol) methyl ether (182.4 g) were added to a separate 1 L resin kettle, stirred, warmed to 40° C., and held until homogeneous. The contents of the 400 Ml beaker were then added to the 1 L resin kettle and deionized $H_2O$ (20.0 g) was used to rinse residual material from the 400 mL beaker. After the temperature of the mixture reached 40° C., formaldehyde (37%, 1.1 mole) (90.2 g) was added and the mixture exothermed to 57° C. The reaction mixture was brought to 72° C. and held at that temperature for approximately 2.5 hours. At about 20 minutes into the hold period, NaOH (50%) (23.3 g) was added to achieve a homogeneous solution. After the hold period, heating was discontinued, deionized $H_2O$ (100.0 g) was added, and the product was placed into a sample jar.

Also following the above procedure, compounds of different compositions can be made with various ratios of bisphenol A/formaldehyde/DL-alanine. The amphoteric compounds (DL-Alanine) used in the above example can also be substituted with other amphoteric compounds and can also be used in conjunction with other amines.

Alternatively, bisphenol A and an amphoteric substituent can be reacted with formaldehyde under appropriate conditions to yield the corresponding Mannich derivative with low residual formaldehyde. More specifically, the reaction can be run so that formaldehyde is the limiting reagent. Thus, all or nearly all of the formaldehyde is used in making the present polyphenolic compositions, leaving little or no residual formaldehyde in the compositions. All of the polyphenolic compounds described in the examples can be prepared according to such methods to produce polyphenols with low residual formaldehyde.

Example 2

Deionized $H_2O$ (75.0 g), glycine (98%, 2.5 moles) (191.8 g), and NaOH (50%) (200.3 g) were added to a 600 mL beaker and stirred at ambient temperature until homogeneous. Bisphenol A (97%, 0.63 mole) (147.3 g) and di(propylene glycol) methyl ether (182.4 g) were added to a separate 2 L resin kettle, stirred, warmed to 40° C., and held until homogeneous. The contents of the 600 mL beaker were then added to the 2 L resin kettle. After the temperature of the mixture reached 38° C., formaldehyde (37%, 2.5 moles) (203.2 g) was added and the mixture exothermed to 72° C. The reaction mixture was maintained at 72° C. and held at that temperature for approximately 2.5 hours. After the hold period, deionized $H_2O$ (1100.0 g) and NaOH (50%) (92.4 g) were added to achieve a homogeneous solution, heating was discontinued, and the product was placed into a sample jar.

Also following the above procedure, compounds of different compositions can be made with various ratios of bisphenol A/formaldehyde/glycine. The amphoteric substituent (glycine) used in the above example can also be substituted in whole or in part with other amphoteric compounds alone or in conjunction with other amines.

Example 3

Deionized $H_2O$ (75.5 g) and phosphoric acid (80%) (2.5 g) were added to a 250 mL beaker and stirred at ambient temperature until homogeneous. Tergitol® 15-S-12, obtained from Union Carbide Corporation, (2.0 g) was then added to the beaker and stirred at ambient temperature until homogeneous. Tergitol is an alcohol ethoxylate surfactant having the general formula $C_{12-14}H_{25-29}O(CH_2CH_2O)_xH$. The product from Example 2 (20.0 g) was then added to the beaker and stirred at ambient temperature until homogeneous. The mixture was then stirred for 20 minutes. The pH of the final solution was 6.5.

Example 4

Deionized $H_2O$ (75.0 g), 4-aminobutyric acid (97%, 0.94 mole) (100.0 g), and NaOH (50%) (75.3 g) were added to a 400 mL beaker and stirred at ambient temperature until homogeneous. Bisphenol A (97%, 0.47 mole) (110.7 g) and Di(propylene glycol) methyl ether (182.4 g) were added to a separate 1 L resin kettle, stirred, warmed to 40° C., and held until homogeneous. The contents of the 400 mL beaker were then added to the 1 L resin kettle and deionized $H_2O$ (20.0 g) was used to rinse residual material from the 400 mL beaker. After the temperature of the mixture reached 41° C., formaldehyde (37%, 0.94 mole) (76.4 g) was added and the mixture exothermed to 60° C. The reaction mixture was brought to 72° C. and held at that temperature for approximately 2.5 hours. At about 10 minutes into the hold period NaOH (50%) (50.6 g) and deionized $H_2O$ (100.0 g) were added to achieve a homogeneous solution. After the hold period, heating was discontinued and the product was placed into a sample jar.

Also following the above procedure, compounds of different compositions can be made with various ratios of bisphenol A/formaldehyde/4-aminobutyric acid. The amphoteric substituent (4-amino-butyric acid) used in the above example can also be substituted in whole or in part with other amphoteric compounds alone or in conjunction with other amines.

Example 5

Deionized $H_2O$ (75.0 g), taurine (99%, 0.64 mole) (80.6 g), and NaOH (50%) (60.0 g) were added to a 400 mL beaker and stirred at ambient temperature until homogeneous. Bisphenol A (97%, 0.32 mole) (75.0 g) and di(propylene glycol) methyl ether (182.4 g) were added to a separate 1 L resin kettle, stirred, warmed to 40° C., and held until homogeneous. The contents of the 400 mL beaker were then added to the 1 L resin kettle and deionized $H_2O$ (20.0 g) and NaOH (50%) (10.0 g) were used to rinse residual material from the 400 mL beaker. After the temperature of the mixture reached 43° C., formaldehyde (37%, 0.64 mole) (51.7 g) was added and the mixture exothermed to 58° C. The reaction mixture was brought to 72° C. and held at that temperature for approximately 2.5 hours. At about 10 minutes into the hold period NaOH (50%) (31.9 g) and deionized $H_2O$ (200.0 g) were added to achieve a homogeneous solution. After the hold period heating was discontinued and the product was placed into a sample jar.

Also following the above procedure, compounds of different compositions can be made with various ratios of bisphenol A/formaldehyde/taurine. The amphoteric compound (taurine) used in the above example can also be substituted in whole or in part with other amphoteric compounds alone or in conjunction with other amines.

Example 6

Deionized $H_2O$ (25.0 g), glycine (98%, 0.94 mole) (72.3 g), and NaOH (50%) (75.5 g) were added to a 250 mL beaker and stirred at ambient temperature until homogeneous. Novolac resin, obtained from Borden as Durite® SD-1731, L5C-0683, MW 3-5K, (100%, 0.94 mole) (100.0 g) and propylene glycol methyl ether, obtained from Dow as Dowanol® PM, (125.0 g) were added to a separate 1 L resin kettle, stirred, warmed to 60° C., and held until homogeneous under $N_2$ at 0.5 standard cubic foot/hour. The contents of the 250 mL beaker were then added to the 1 L resin kettle. After the temperature of the mixture reached 63° C., formaldehyde (37%, 0.94 mole) (76.6 g) was added and the mixture exothermed to 83° C. The reaction mixture was brought to 90° C. and held at that temperature for approximately 2.5 hours. At about 40 minutes into the hold period, propylene glycol methyl ether (100.0 g), NaOH (50%) (75.0 g), and deionized $H_2O$ (450.0 g) were added to reduce the viscosity of the homogeneous solution. After the hold period heating was discontinued and the product was placed into a sample jar.

Also following the above procedure, polymers of different compositions can be made with various ratios of novolac resin/formaldehyde/glycine. The composition of the polymer resin can also be varied with respect to molecular weight and substituents. The amphoteric compounds used in the above example can also be substituted in part with other amines.

Example 7

Deionized $H_2O$ (75.0 g), glycine (98%, 1.25 moles) (95.9 g), and NaOH (50%)(100.1 g) were added to a 400 mL beaker and stirred at ambient temperature until homogeneous. Bisphenol A (97%, 0.63 mole)(147.3 g) and di(propylene glycol) methyl ether (182.4 g) were added to a 2 L resin kettle, stirred, warmed to 40° C., and held until homogeneous. Diethanolamine (99%, 1.25 moles)(132.9 g) was added to the 2 L resin kettle, stirred, and held at 40° C. until homogeneous. The contents of the 400 mL beaker were then added to the 2 L resin kettle. After the temperature of the mixture reached 40° C., formaldehyde (37%, 2.5 moles) (203.2 g) was added and the mixture exothermed to 61° C. The reaction mixture was raised to and maintained at 72° C. and held at that temperature for approximately 2.5 hours. After the hold period, deionized $H_2O$ (325.0 g), di(propylene glycol) methyl ether (25.0 g), and NaOH (50%)(94.7 g) were added to achieve a homogeneous solution, heating was discontinued, and the product was placed into a sample jar.

Following the above procedure, compounds of different compositions can be made with various ratios of bisphenol A/formaldehyde/glycine/diethanolamine, and/or other amphoteric compounds alone or in conjunction with other amines.

Example 8

Dilute solutions of the above formulations were application tested using the Micro Foam Baffle Test. In a typical test 2 ply packing foam was cut into two 2¼"×10" strips with two corners (same side) removed. The plies were separated and the ply containing holes was discarded. The remaining ply was dried in a 105° C. oven for 60 minutes. Paper fiber, to include stickies, (75.0 g) was placed into a disintegrator for 30 minutes. The fiber was created by adding four ⅓ cut Avery file folder labels to a single piece of copy paper. This is done four fold for a total of 16 labels on 4 pieces of copy paper. The difference in weight is made up with copy paper. The copy paper was cut into 1" wide strips, torn into 1" long pieces, and placed into the disintegrator. Warm tap water (~45° C., 1,425 g) was placed into the disintegrator (5% active fiber solution). The packing foam was removed from the oven, weighed to four decimal places, and placed into fabricated baffles. The fiber solution (5% active) was diluted to 1% by placing the furnish into a plastic container equipped with a tap and brought to a total furnish weight of 7,500 g with warm tap water. The resulting solution was stirred with an overhead mixer for ten minutes. Furnish (3,750 g) was removed from the plastic container and transferred to a 12 L stainless steel baffle beaker. Warm tap water (3,750 g) was added to obtain a 0.5% active fiber solution. The 12 L stainless steel baffle beaker was placed on a hot plate equipped with an overhead stirrer and set to 40° C.

After stabilization at about 40° C. the polyphenols prepared according to Examples 1–5 above (available from Calgon Corporation, Pittsburgh Pa.) were added and held for ten minutes. As a control, no polyphenolic was added and as a comparative test a p-cresol compound, which is not a polymer, was used. The baffles containing the packing foam were then lowered into the fiber solution and attached to the inside wall of the 12 L stainless steel baffle beaker for 30 minutes. The baffles were then removed and washed. The packing foam was then removed from the baffles, washed again, placed in a 105° C. oven for thirty minutes, and re-weighed. The difference in weight is then recorded as mg of stickies as indicated in Table 1 below. This number represents the amount of stickies in the furnish. As can be seen on Table 1, the amount of stickies in the furnish is greatly reduced when using the polyphenolic compounds of the present invention. More specifically, the percent of stickies in the furnish was reduced by half when using the polyphenolic compound prepared with taurine when compared with the control in which no polyphenolic compound was added. The percent reduction with compounds made with other amino acids and amino acid derivatives was even greater. The amount of stickies when using the Mannich-derivatized p-cresol compound prepared according to the present invention, however, was actually greater then when using no polyphenolic at all. Much greater reductions in percent of stickies were seen with the use of the present polyphenolic compounds prepared using amino acids and amino acid derivatives.

TABLE 1

Micro Foam Baffle Test Results (pH = 7, 40° C.)

| Example # | Amine | Active Methylene | Stickies (mgs) | % Stickies Reduction | Ratio* |
|---|---|---|---|---|---|
| Comparative | Glycine** | p-cresol | 104.2 | −37 | 1/2/2*** |
| Control | Control | NA | 76.2 | 0 | NA |
| 5 | Taurine | BPA# | 38.0 | 50 | 1/2/2 |
| 4 | 4-Amino-butyric Acid | BPA# | 17.5 | 77 | 1/2/2 |
| 3 | Glycine## | BPA# | 14.6 | 81 | 1/4/4 |
| 2 | Glycine### | BPA# | 9.9 | 87 | 1/4/4 |
| 1 | DL-Alanine | BPA# | 7.4 | 90 | 1/2/2 |

Product Dose, except for the control, is two (2) pounds of 8.4% active product per air dried ton of fiber (lbs/ton)
*Ratio of BPA/Formaldehyde/Amine
**p-Cresol was substituted for Bisphenol A
***Ratio of p-Cresol/Formaldehyde/Amine
Bisphenol A (BPA)
pH = 6.5 (undiluted sample)
pH > 12.0 (undiluted sample)

The results of the above examples show that the application of the polyphenolic compounds in accordance with the present invention provides resistance to stickies.

Whereas particular embodiments of this invention have been described above for purposes of illustration, it will be evident to those skilled in the art that numerous variations of the details of the present invention may be made without departing from the invention as defined in the appended claims.

What is claimed is:

1. A polyphenolic composition having at least two phenol rings wherein at least one amphoteric substituent, or salt thereof, is attached to at least one of said rings.

2. The polyphenolic composition of claim 1, wherein the polyphenol is selected from the group comprising bisphenols, novolacs and polymers of bisphenol and an epoxy.

3. The polyphenolic composition of claim 2, wherein said polyphenol is a bisphenol compound comprised of a plurality of molecules of the formula (4)

$$(R)_m\text{-}\bigcirc\text{-}Z\text{-}\bigcirc\text{-}(R)_{m'} \quad HO\text{-}\phantom{a}\phantom{a}\phantom{a}\phantom{a}\text{-}OH \qquad (4)$$

wherein Z is a straight chain or a branched chain aliphatic having between 1 and 3 carbon atoms, wherein "R" is an amphoteric substituent, and the average value of m+m' for all of the molecules in said composition is between about 0.5 and 4.0.

4. The polyphenolic composition of claim 3, wherein Z is 2,2-propylidene.

5. The polyphenolic composition of claim 4, where R is $CH_2NHCH_2COOH$, or a salt thereof.

6. The polyphenolic composition of claim 2, wherein the polyphenol is a novolac resin polymer of the formula (6)

$$\left(\begin{array}{c}OH\\ \bigcirc\\ R\end{array}\text{-}CH_2\text{-}\right)_x \qquad (6)$$

wherein R is an amphoteric substituent and x represents the number of repeat units in said polymer.

7. The polyphenolic composition of claim 1, wherein said amphoteric substituent is derived from a member selected from the group comprising amino acids and amino acid derivatives.

8. The polyphenolic composition of claim 1, wherein said amphoteric substituent is derived from taurine.

9. The polyphenolic composition of claim 3, further polymerized with an epoxide resin.

10. The polyphenolic composition of claim 9, wherein said epoxide resin is a diglycidal capped prepolymer of bisphenol and epichlorohydrin.

11. A method for controlling stickies, comprising adding to a stickie-containing solution an effective amount of a polyphenolic composition having at least two phenol rings wherein at least one amphoteric substituent, or salt thereof, is attached to at least one of said rings.

12. The method of claim 11, wherein the polyphenol is selected from the group comprising bisphenols, novolacs and polymers of bisphenol and an epoxy.

13. The method of claim 12, wherein said polyphenol is a bisphenol compound comprised of a plurality of molecules of the formula (4)

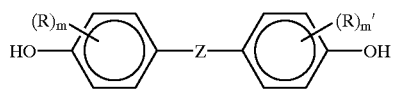

(4)

wherein Z is a straight chain or a branched chain aliphatic having between about 1 and 3 carbon atoms; wherein "R" is an amphoteric substituent and the average value of m+m' for all of the molecules in said composition is between about 0.5 and 4.0.

14. The method of claim 13, wherein Z is 2,2-propylidene.

15. The polyphenolic composition of claim 11, wherein said amphoteric substituent is derived from a member selected from the group comprising amino acids and amino acid derivatives.

16. The polyphenolic composition of claim 11, wherein said amphoteric substituent is derived from taurine.

17. The method of claim 13, wherein said polyphenolic compound is further polymerized with an epoxide resin.

18. The method of claim 17, wherein said epoxide resin is a diglycidyl capped prepolymer of bisphenol and epichlorohydrin.

19. The method of claim 11, wherein said polyphenolic composition has a molecular weight of less than about 20,000.

20. The method of claim 11, wherein said effective amount is between about 0.01 pounds to about 10 pounds polyphenolic composition per ton of dry fiber.

21. The method of claim 11, wherein said solution is a pulp slurry containing secondary fiber.

22. The method of claim 11, wherein said solution is a pulp slurry containing broke.

* * * * *